(12) United States Patent
Isaacs

(10) Patent No.: US 10,467,590 B2
(45) Date of Patent: Nov. 5, 2019

(54) BUSINESS PROCESS OPTIMIZATION AND PROBLEM RESOLUTION

(75) Inventor: Malcolm Isaacs, Modi'in (IL)

(73) Assignee: MICRO FOCUS LLC, Santa Clara, CA (US)

( * ) Notice: Subject to any disclaimer, the term of this patent is extended or adjusted under 35 U.S.C. 154(b) by 952 days.

(21) Appl. No.: 12/239,748

(22) Filed: Sep. 27, 2008

(65) Prior Publication Data

US 2010/0082378 A1   Apr. 1, 2010

Related U.S. Application Data

(60) Provisional application No. 61/048,675, filed on Apr. 29, 2008.

(51) Int. Cl.
*G06Q 10/10* (2012.01)
*G06Q 10/06* (2012.01)

(52) U.S. Cl.
CPC .......... *G06Q 10/10* (2013.01); *G06Q 10/063* (2013.01); *G06Q 10/06393* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | | | | |
|---|---|---|---|---|---|
| 4,965,743 | A | * | 10/1990 | Malin .................... | G05B 17/02 703/17 |
| 5,067,099 | A | * | 11/1991 | McCown ............ | G06F 11/2257 700/30 |
| 5,838,595 | A | * | 11/1998 | Sullivan .............. | G03F 7/70516 703/2 |
| 6,216,098 | B1 | * | 4/2001 | Clancey ................ | G06Q 10/10 703/6 |
| 6,490,572 | B2 | * | 12/2002 | Akkiraju ............... | G06Q 10/04 706/13 |

(Continued)

OTHER PUBLICATIONS

Hilbert, David M.; Redmiles, David F.; "An Approach to Large-Scale Collection of Application Usage Data Over the Internet", ICSE '98 Proceedings of the 20th international conference on Software engineering; IEEE Computer Society Washington DC. USA 1998 ISBN: 0-8186-8368-6.*

(Continued)

*Primary Examiner* — Alan S Miller

(57) ABSTRACT

One embodiment provides a system for optimizing business processes comprising an analyzer component configured to retrieve testing data on a business application, wherein the testing data is generated before deployment of the business application. The analyzer component is further configured to retrieve actual data on the business application, wherein the actual data is generated during deployment of the business application. The analyzer component is further configured to analyze the actual data and the testing data to identify at least one business process from the actual data, wherein an identified business process from the actual data is attempted to be matched with a baseline business process defined during testing. The system further comprises a report generator configured to output results from analysis of the actual data and the testing data. Output results may be used to optimize testing and to correlate problems encountered in the field with situations encountered during testing.

17 Claims, 4 Drawing Sheets

(56) References Cited

U.S. PATENT DOCUMENTS

| | | | | |
|---|---|---|---|---|
| 6,581,037 B1* | 6/2003 | Pak | ................... | G09B 5/00 705/1.1 |
| 6,662,312 B1* | 12/2003 | Keller | ................. | G06F 11/3688 714/38.14 |
| 6,701,514 B1* | 3/2004 | Haswell | ............. | G06F 11/3664 707/999.102 |
| 6,725,399 B1* | 4/2004 | Bowman | ............ | G06F 11/3664 714/38.14 |
| 6,961,873 B2* | 11/2005 | Dubovsky | .......... | G06F 11/3688 714/38.13 |
| 7,289,857 B2* | 10/2007 | Nauck | ................... | G05B 17/02 600/300 |
| 7,454,660 B1* | 11/2008 | Kolb | .................. | G06F 11/3414 714/38.14 |
| 7,487,148 B2* | 2/2009 | James | ................ | G06K 9/0063 |
| 7,506,302 B2* | 3/2009 | Bahrami | .............. | G06Q 10/10 717/100 |
| 7,526,498 B2* | 4/2009 | Dubovsky | .......... | G06F 11/3664 |
| 7,636,871 B1* | 12/2009 | Blue | .................. | G06F 11/3676 703/13 |
| 7,752,607 B2* | 7/2010 | Larab | .................... | G06Q 10/10 717/135 |
| 7,774,363 B2* | 8/2010 | Lim | ...................... | G06F 21/604 707/781 |
| 7,797,415 B2* | 9/2010 | Peracha | ............. | G06F 11/3419 702/181 |
| 7,930,683 B2* | 4/2011 | Li | ............................ | G06F 8/71 717/124 |
| 8,185,877 B1* | 5/2012 | Colcord | .................. | G06F 9/44 717/124 |
| 2002/0040434 A1* | 4/2002 | Elliston | .................. | H04L 67/42 713/186 |
| 2002/0083213 A1* | 6/2002 | Oberstein | .......... | G06F 11/3684 719/313 |
| 2003/0004663 A1* | 1/2003 | Masella, Jr. | ... | G01R 31/318342 702/66 |
| 2003/0236677 A1* | 12/2003 | Casati | ................ | G06Q 10/0633 705/7.27 |
| 2003/0236689 A1* | 12/2003 | Casati | ............. | G06Q 10/06316 705/7.26 |
| 2004/0034857 A1* | 2/2004 | Mangino | ................ | G06Q 10/06 718/104 |
| 2005/0015666 A1* | 1/2005 | Kamani | ............. | G06F 11/3688 714/25 |
| 2006/0184410 A1* | 8/2006 | Ramamurthy | ......... | G06Q 10/10 706/8 |
| 2006/0247965 A1* | 11/2006 | Griffith | .................. | G06Q 10/06 705/348 |
| 2006/0293934 A1* | 12/2006 | Tsyganskiy | ............... | G06F 8/72 705/7.29 |
| 2007/0055558 A1* | 3/2007 | Shanahan | .............. | G06Q 10/06 705/7.26 |
| 2007/0083386 A1* | 4/2007 | Chuang | .................. | G06Q 50/22 705/2 |
| 2007/0180094 A1* | 8/2007 | Roth | .................... | G06F 11/3688 709/223 |
| 2007/0219941 A1* | 9/2007 | Schnurr | .............. | G06F 11/3466 |
| 2008/0059437 A1* | 3/2008 | Nagappan | ........... | G06F 16/2465 |
| 2008/0086348 A1* | 4/2008 | Rao | ...................... | G06Q 10/063 705/7.11 |
| 2008/0086660 A1* | 4/2008 | Wefers | ................ | G06F 11/3688 714/37 |
| 2008/0114710 A1* | 5/2008 | Pucher | ................... | G06N 20/00 706/20 |
| 2008/0163015 A1* | 7/2008 | Kagan | ................. | G06F 11/2294 714/724 |
| 2009/0138425 A1* | 5/2009 | Narayanaswamy | ... | G06Q 10/04 706/48 |
| 2009/0198481 A1* | 8/2009 | Narayanaswamy | ... | G06Q 10/04 703/13 |
| 2009/0198533 A1* | 8/2009 | Narayanaswamy | ... | G06Q 10/06 705/7.11 |
| 2009/0210837 A1* | 8/2009 | Craig | .................. | G06F 17/5022 716/106 |

OTHER PUBLICATIONS

A Rozinat ISM de Jong;Process Mining of Test Processes;XP002531193.
Cook J E et al;Software process validation;HP000961880.
European Patent Office, Communication pursant to Article 94(3) EPC / EPO Office Action, dated Jan. 11, 2012, 6 pages, Netherlands.
HPCO;five myths of infrastructure monitoring;XP002531192.
HPCO;Inseider's guide to real-user;XP002531191.
Schiefer et al., Simulating Business Process Scenarios for Event-Based Systems, 12 pages.
Schiefer et al., Testing Event-Driven Business Processes, Journal of Computers, Oct.-Nov. 2006, 12 pages, vol. 1, No. 7.
Van der Aalst;Petri nets and other models of concurrency A ICATPN 2007;XP019062231.
W.M.P. Van Der Aalst, Business alignment: using process mining as a tool for Delta analysis and confomrance testing, Aug. 19, 2005, 14 pages, Springer-Verlag London Limited 2005.

\* cited by examiner

BUSINESS PROCESS OPTIMIZATION AND PROBLEM RESOLUTION

CROSS REFERENCE TO RELATED APPLICATIONS

This Application claims the benefit of U.S. provisional patent application Ser. No. 61/048,675, filed Apr. 29, 2008, titled "Business Process Optimization and Problem Resolution by Test Data Mining," which application is hereby incorporated by reference herein as if reproduced in full below.

TECHNICAL FIELD

The present disclosure is related to analysis of business operations.

BACKGROUND

Businesses often have business processes which need to be tested to ensure that the organizational systems (e.g., personnel, computer, etc.) can support these business processes. The amount of testing performed for any given business process is usually correlated to the perceived criticality of that process in relation to other business processes. However, this can give rise to business processes that are not considered critical, but which are executed often. Alternatively, this may give rise to processes that are considered critical, but are execute d only occasionally. It would be of benefit to the organization to correlate the amount of testing of a given business process to the actual criticality of that process, as opposed to the perceived criticality.

In addition, resources are sometimes dedicated to testing business processes that are never used in practice. Conversely, business processes are sometimes used frequently in an organization, but never tested.

Also, there are many occasions during the testing phase of a product where the test fails, due to defects in the system, or perhaps due to environmental considerations (e.g., wrong versions of components, network problems, etc). These problems are therefore resolved during testing. Users encountering these problems in the field often turn to the system support personnel for help. Because the support personnel is generally not part of the testing team, they are unaware that similar symptoms have been encountered during testing and that there is a solution available.

SUMMARY

Embodiments of the present disclosure provide systems for optimizing business processes. One embodiment of a system comprises an analyzer component configured to retrieve testing data on a business application, wherein the testing data is generated before deployment of the business application. The analyzer component is further configured to retrieve actual data on the business application, wherein the actual data is generated during deployment of the business application. The analyzer component is further configured to analyze the actual data and the testing data to identify at least one business process from the actual data, wherein an identified business process from the actual data is attempted to be matched with a baseline business process defined during testing. The system further comprises a report generator configured to output results from analysis of the actual data and the testing data. Output results may be used to optimize testing and to correlate problems encountered in the field with situations encountered during testing.

The present disclosure can also be viewed as providing methods for optimizing business processes. One embodiment of such a method comprises retrieving testing data on a business application, wherein the testing data is generated before deployment of the business application; retrieving actual data on the business application, wherein the actual data is generated during deployment of the business application; and analyzing the actual data and the testing data to identify at least one business process from the actual data, wherein an identified business process from the actual data is attempted to be matched with a baseline business process defined during testing.

Other systems, methods, features, and advantages of the present disclosure will be or become apparent to one with skill in the art upon examination of the following drawings and detailed description. It is intended that all such additional systems, methods, mediums, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

One approach to optimize business or organizational processes is to gather data on real users, executing real scenarios, rather than contrived examples within a test lab. The system of FIG. 1 facilitates such an approach. In particular, FIG. 1 is a block diagram of one embodiment of a system for optimizing business or organizational processes.

Figure 1:
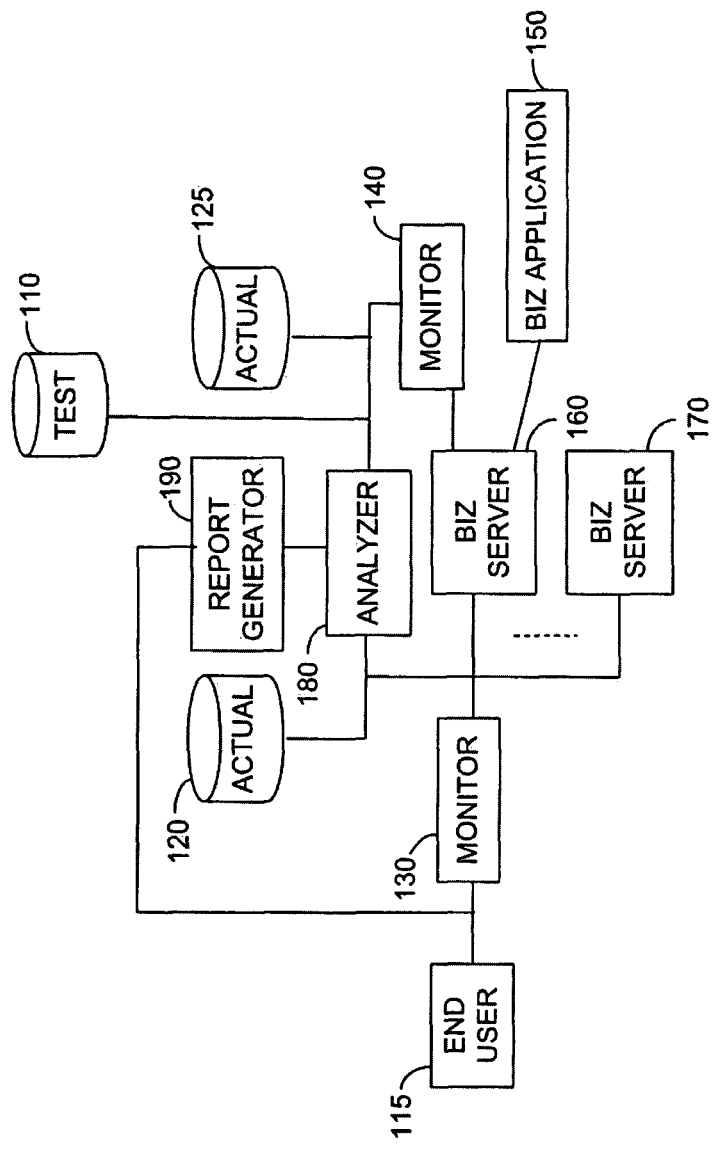
FIG. 1 is a block diagram of one embodiment of a system for optimizing business processes.

Referring to FIG. 1, a first database 110 maintains test data obtained during testing of a business or organizational application ("biz application") 150. For example, during testing of business application(s) 150, a bank of baseline business or organizational processes may be developed using business software. The baseline processes define current business processes as constituted by the testing team. This testing data is maintained in a database 110 so that it may be used for analysis in the future.

It is noted that during the testing phases of a business application's lifecycle, a huge amount of information is generated, such as log files, monitoring information, statistics, etc. In many testing environments, this information is generally discarded after testing has completed and the business application 150 has been deployed for actual use.

Embodiments described in this disclosure make use of this information to feed real use data back into an optimization system for the purposes of optimizing testing and to also correlate problems encountered in the field with situations encountered during testing. In the figure, a database 110 of testing information is maintained, such as log files, monitoring information, statistics, etc. This information pertains to testing of an application 150 that has since been deployed in an organizational network. In the example of FIG. 1, the application 150 resides on a server ("biz server") 160.

Accordingly, real or actual usage data about business processes may be obtained from the deployed system and maintained in database(s) 120, 125. This deployed data is maintained in database 120 so that it may be compared with the testing data.

Real or actual usage data may be obtained using monitors 130, 140. One type of monitor 130 (e.g., Hewlett Packard Real User Monitor™ software) that may be used gathers data from an end user's perspective, such as requests being received from an end user's computer 115 to be performed by a business application 150 and the responses to these requests from the business application 150. The monitor 130 may be configured to capture all user traffic passing from the user's computer 115 to a server 160. The monitor 130 feeds the data it gathers to database 120.

Real usage data may also be obtained on the back-end from business servers 160, 170, such as web servers or application servers. This type of monitor 140 (e.g., Hewlett Packard SiteScope® software) monitors system parameters such as disk usage, processes, and application-specific events. The monitor 140 feeds the data it gathers to a third database 125.

Although the figure refers to three databases 110, 120, 125, embodiments of the present disclosure are not limited to the examples provided in the figure. Testing data and/or actual usage data may be maintained or consolidated in a single database or a plurality of databases.

An analyzer component 180 compares real usage data obtained in practice of business applications 150 and servers with testing data obtained during testing of such business applications and servers. For example, the analyzer 180 may compare the real usage data with baseline information obtained during testing to identify items of interest about actual business or organizational processes.

For example, the least and most popular business processes in practice can be identified by the analyzer 180. The analyzer 180 can identify business processes in practice not covered during testing. The analyzer 180 can further identify business process that were covered during testing but are not used in practice. In one embodiment, the analyzer 180 can identify the complexity of business processes in practice as compared to how the business processes were defined during testing. The information developed by the comparison of the actual use data with the testing data can be used to improve further testing efforts. For example, based on this information, the quality of testing can be assessed by the analyzer 180, such as whether the correct areas are being tested and whether they are being tested correctly. Also, the analyzer 180 can formulate recommendations to be made or diagnostic information based on information procured from analyzing the testing and real usage data, such as detecting inappropriate resource usage (e.g., memory leaks, database transactions opened but not closed).

Therefore, business processes may be highlighted in real usage situations that are disproportionately represented during the testing phase, with an aim of optimizing the way that the business process is tested. For example, during testing, a large amount of potentially valuable information about the system is generated, but this information is often discarded by other systems. The system of FIG. 1 and related approaches can make use of this information.

Referring back to FIG. 1, a report generator 190 compiles reports based on results of analysis of data by the analyzer 180. As an example, reports can be generated by the report generator 190 for support personnel for the purposes of problem resolution by identifying similar problems encountered in practice that were also encountered during testing.

For example, after a business application 150 has been deployed and run for enough time to get a representative set of real user data, a report can be generated to the user by the report generator 190, to describe the business processes that have been identified in the system, and how well they are covered by testing. Similarly, if a customer complains about a specific problem, a user at a service desk can query the analyzer 180 to retrieve real user data and identify similarities with baselines that were collected during the testing phase, to try to locate a match to the customer's problem, and report the solution.

Therefore, problems encountered in the field can be matched with similar issues encountered during testing, thus reducing the time necessary to resolve an issue, and reducing the number of escalations.

Figure 2:
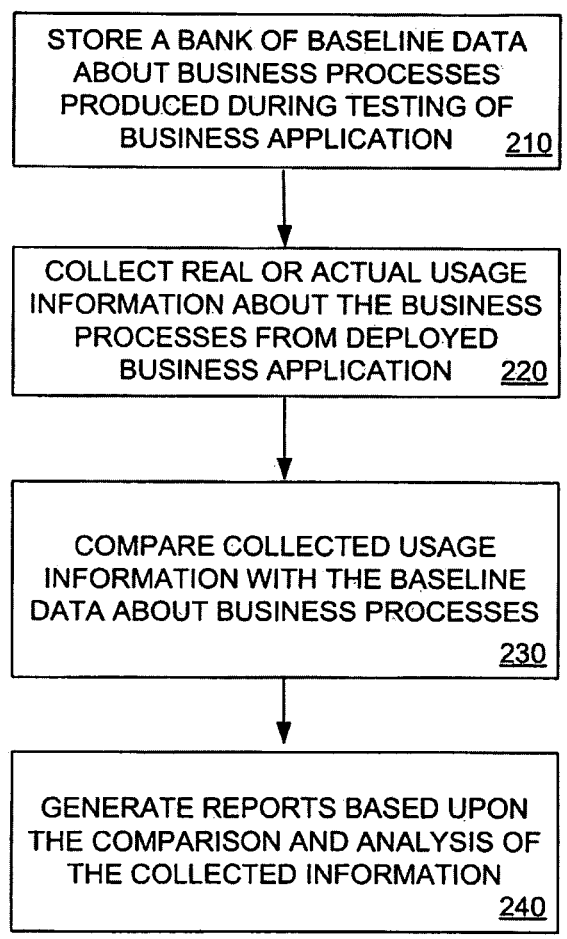
FIG. 2 is a flow chart describing one embodiment of a method of optimizing business processes in accordance with FIG. 1.

The flow chart of FIG. 2 describes one embodiment of a method of optimizing business processes. In block 210, during a testing phase of an application 150, a bank of baseline data about business processes are produced and stored in a database 110. Existing tools such as Hewlett Packard Quality Center™ software, Hewlett Packard Quick-Test® Professional software, Hewlett Packard LoadRunner® software, Hewlett Packard Business Process Testing™ software, Hewlett Packard Business Availability Center™ software, and Hewlett Packard Real User Monitor™ can be used to, but not limited to being used to, produce a bank of baseline data about business processes. Once the application 150 is deployed in the field, real or actual usage information is collected about the business processes from the deployed application, as depicted in block 220. Existing tools such as Hewlett Packard Business Availability Center™ software and Hewlett Packard Real User Monitor™ software can be used to, but not limited to being used to, collect the real usage information. In block 230, the collected usage information is compared with the baseline business process information. For example, baseline processes identified in the testing data are attempted to be identified in the actual usage data. Accordingly, there may be extra, or fewer steps in the actual business process or the steps might be performed in a different order. Further, a baseline business process may not even be completed in actual practice. In one embodiment, the analyzer 180 is configured to measure a level of deviation of the identified process from the baseline process, where a measure of deviation from the baseline is related to the quality of the baseline business processes, and the usability of the system. For example, a business process identified from actual usage that is closely matched to a baseline process indicates that the baseline process is used in practice. On the other hand, a business process identified from actual usage that is not closely matched to a baseline process indicates that the business process has not been tested.

Reports are generated based upon the comparison and analysis of the collected information in block 240. The reports may include recommendations to quality assurance or testing with areas that may need addressing in the next testing cycle of the application.

Generally, an important part of the testing process is the creation of repeatable tests that exercise specific functionality within an application. These tests can be chained together to exercise larger parts of the functionality, such as business processes. Each test should be designed to be unique, and every time a test is run, the application 150 is expected to react in a specific way. All the components of a business process, such as a database 110, the application server 160, the client 115, etc., have their own reactions to the stimuli of the test. The combination of reactions of all the components of the business process is unique to each test, and can be represented as a 'fingerprint' to a given stimulus.

When the application 150 is deployed, it will be used in a manner which may or may not replicate the way the application 150 was tested. By monitoring the deployed application 150, it will be possible to identify matches with varying degrees of correlation to the fingerprints acquired during the testing phase.

Using the baselines and the actual user data as input, business processes within the actual user data are 'identified' within the actual user data by analyzer 180. Further, the analyzer 180 is configured to identify business processes that were tested and are actually used in practice; were tested but not used in practice; are used differently in practice to the way they were tested; and are used in practice but were never tested.

In one embodiment, business processes are identified as follows by the analyzer 180. During testing and during deployment, monitors 120, 130 capture events, messages, or other data collected by computer systems. Embodiments of the present disclosure may identify a process from one or more log files and/or databases comprising events corresponding to the execution of operations by one or more applications. Process data is extracted by reading business process data from a database or log file stored in a storage medium. In one embodiment, the log file or database 135 comprises a series of time stamps that correspond to the times at which a plurality of business process steps were either started or stopped. In addition, in one embodiment of the invention, the database or log file also stores information about the context in which a particular business process step was performed. For example, an entry in the log file can contain information that says that an "approval" step was started at 3:30 pm and completed at 4:15 pm, and that it was executed in the context of business process number 539. In another embodiment, an entry in the log file can contain a start time and a completion time for one step in an order fulfillment system.

As described above, an entry in the log file contains information regarding the start time, stop time, and context of the steps in a business process. For example, the log file can include the start times and end times for a set of business tasks represented by $T_1, T_2, \ldots, T_n$. Specifically, for a particular task, $T_i$, the log file can include a start time, $T_i^s$, and a stop time, $T_i^e$. The start and stop times for each of the tasks are referred to as an event. In one embodiment, $T_1, T_2, \ldots, T_n$ comprises customer orders and $T_i^s$ and $T_i^e$ comprise the start and completion times for a particular parts of a customer order.

The business processes identified during testing are regarded as baseline business processes. During deployment, processes are identified and attempted to be matched to the baseline processes. Each baseline business process comprises a distinctive set of markers, such as lines in a log file. Each collection of markers has a unique pattern. For example, the lines in a log file generated when saving a file is different from the lines in a log file generated when opening a file. The analyzer 180 searches for similar patterns in the actual or real usage data, and if a similar pattern is detected, the analyzer 180 notes how it deviates from the original pattern.

In one embodiment, the criteria for similarity is configurable by a user, and can mean that the start and end markers were found, with at least 50% of the middle markers present (not necessarily in the correct order). Alternatively, it could mean that the start markers plus 70% of the middle markers are present, but the last 30%, including the end marker are absent. 'Similar' can also mean that the start was found, but not the end, or vice-versa.

An exemplary implementation of this system may involve the following. Assume a baseline log file that appears as follows, in response to a specific business process:

log line a
log line b
log line c

This would be formed into the 'word' "abc". Now assume, a log file from real usage data contains the following:

log line x
log line a
log line y
log line x
log line b
log line c

This would be formed into the word "xayxbc".

Using algorithms such as the BLAST algorithm (used in genetics to compare sequences of DNA), the analyzer 180 may identify that the word 'abc' appears in the word "xayxbc" and give it a score based on the level of deviation between the two words. The higher the score entails that the closer the match between the two words. For example, if the real usage data formed the word "abxc", the score would be higher.

Other suitable algorithms for measuring deviation levels may involve the Levenshtein algorithm or Smith-Waterman algorithm, which are used in plagiarism detection by determining the similarity of texts. For example, words with a Levenshtein distance<k may be considered 'similar', where k may be adjusted by a user to modify how the similarity of words are determined. Further, alerts can be generated (via analyzer 180 or report generator 190) such that if many users of a site or application generate many 'similar' business processes with a relatively high Levenshtein distance, an administrator is informed.

Based on the reports summarizing the output of the fingerprint identification and correlation procedure, a user can optimize the testing that is performed, by reducing the amount of testing of business processes that are never used; increasing the coverage of business processes that are used frequently; refining the tests to match the way the business processes are used; and extrapolating usability information. For example, if the online help is consistently accessed as determined from the monitoring of real usage data, the business process may not be clearly defined. If the end user always has to interrupt a business process to make a selection from a list (and perhaps even consistently selects the same thing), this may indicate that the list should be available as part of the business process.

Therefore, reports may be generated providing recommendations to the user on how to improve testing. Reports may identify, but are not limited to identifying, usability issues, such as business processes that consistently require access to help; business processes that were abandoned half-way through; business process statistics (e.g., average execution time, number of transactions, etc.); business processes that are never executed; popular business processes based on actual usage data; business process sequences that could be simplified. Further, reports may identify testing issues such as business processes that were never tested; and business processes that are commonly executed by users in a way that was never tested.

Using such reports, as an example, subject matter experts can have more control over the development process. Unused or ineffectual processes that have been identified can be deprecated, saving research and development resources for more urgent tasks. Further, the subject matter expert gets live feedback from the deployed system, and does not have to rely on the few customers who find the time to answer surveys. From the reports, feedback to the subject matter expert can be in terms of business processes and not in terms of technical system jargon, such as lines from a system's log files.

Further, from generated reports, a management team can identify inefficient resource allocation; ensure that the correct business processes are being developed; focus on business processes that the user actually needs; get feedback from users based on actual data, not surveys or hunches; get better understanding of customer behavior; and gain an ability to adapt proactively based on usage trends.

The business optimization system of FIG. 1 may allow testers to optimize their resources by focusing on those business processes that are actually used in practice. It will save time spent on testing business processes that are not used, and that time can be used for more intensive testing of the business processes that are really critical.

Embodiments of the business optimization system of FIG. 1 may provide the link between application management and application delivery and vice-versa. It will allow the reuse of information generally discarded during testing, by saving it and using it for business process optimization and for problem resolution. Accordingly, embodiments of the present disclosure can facilitate the providing of a full application lifecycle by taking an application from the test phase to the deploy phase, and using the information gleaned in the deploy phase to drive resource placement in the upgrade phase.

Figure 3:
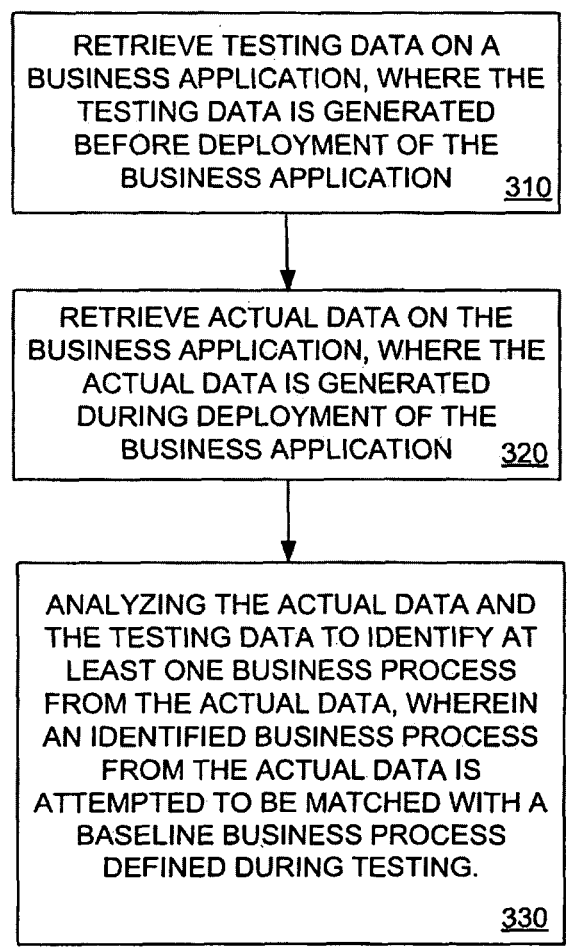
FIG. 3 is a flow chart describing one embodiment of a method of optimizing business processes in accordance with FIG. 1.

Referring now to FIG. 3, one embodiment of a method of optimizing business processes is described. In block 310, an analyzer 180 retrieves test data on a business application. The test data is generated before deployment of the business application in a business environment or network. Further, in block 320, the analyzer 180 retrieves actual data on the business application after the application is deployed in the business environment or organization. The analyzer 180 then analyzes, in block 330, the actual data and the testing data to identify a business process from the actual data, where an identified business process is attempted to be matched with a baseline business process defined during testing of the business application.

Certain embodiments of the present disclosure can be implemented in hardware, software, firmware, or a combination thereof. In some embodiment(s), analyzer 180 and report generator 190 and other components are implemented in software or firmware that is stored in a memory or other computer readable medium and that is executed by a suitable instruction execution system. If implemented in hardware, as in an alternative embodiment, components can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
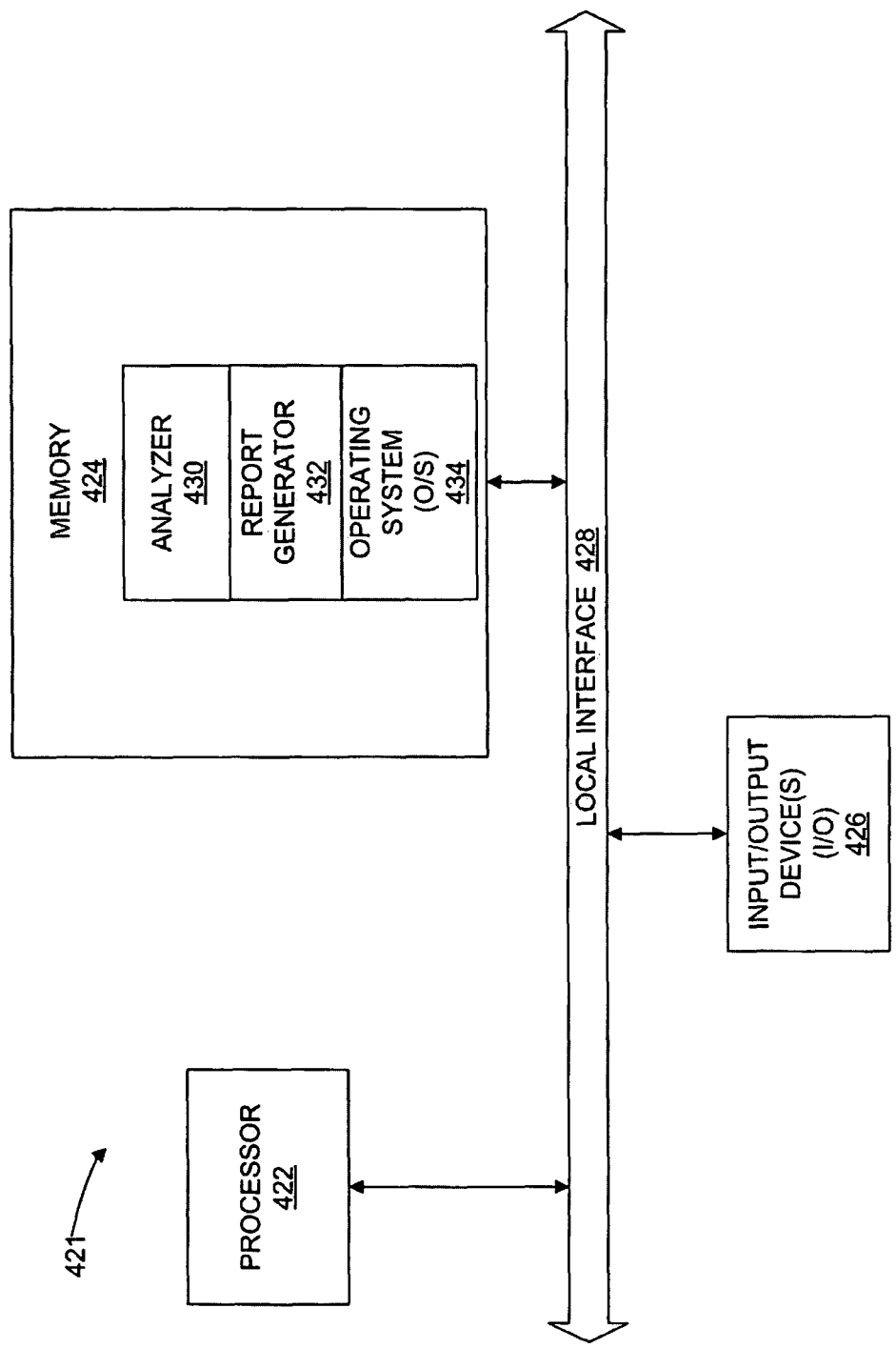
FIG. 4 is a block diagram of an embodiment of a computer system which implements components of the system of FIG. 1.

An example of an instruction execution system that can implement the analyzer 180 and report generator 190 components of the present disclosure is a general-purpose computer 421 which is shown in FIG. 4. Generally, in terms of hardware architecture, as shown in FIG. 4, the computer 421 includes a processor 422, memory 424, and one or more input and/or output (I/O) devices 426 (or peripherals) that are communicatively coupled via a local interface 428. The local interface 428 can be, for example but not limited to, one or more buses or other wired or wireless connections, as is known in the art. The local interface 428 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 422 is a hardware device for executing software, particularly that stored in memory 424. The processor 422 can be any custom made or commercially available processor, a central processing unit (CPU), an auxiliary processor among several processors associated with the computer 421, a semiconductor based microprocessor (in the form of a microchip or chip set), a macroprocessor, or generally any device for executing software instructions.

The memory 424 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 424 may incorporate electronic, magnetic, optical, and/or other types of storage media. Note that the memory 424 can have a distributed architecture, where various components are situated remote from one another, but can be accessed by the processor 422.

The software in memory 424 may include one or more separate programs, each of which comprises an ordered listing of executable instructions for implementing logical functions. In the example of FIG. 4 the software in the memory 424 includes the analyzer 430 and report generator 432, in accordance with the present disclosure and a suitable operating system (O/S) 434. The operating system 434 controls the execution of other computer programs and provides scheduling, input-output control, file and data management, memory management, and communication control and related services.

I/O devices 426 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

When the computer 421 is in operation, the processor 422 is configured to execute software stored within the memory 424, to communicate data to and from the memory 424, and to generally control operations of the computer 421 pursuant to the software. The analyzer 430, report generator 432, and the O/S 434, in whole or in part, but typically the latter, are read by the processor 422, perhaps buffered within the processor 422, and then executed.

In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of the present disclosure includes embodying the functionality of the embodiments of the present disclosure in logic embodied in hardware or software-configured mediums.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the present disclosure. All such modifications and variations are intended to be included herein within the scope of this disclosure and protected by the following claims.

Therefore, having just described embodiments of the invention, at least the following is claimed:

1. A method for optimizing business processes comprising:
   storing, in a database, test data of a business application generated during a testing phase of the business application;
   identifying, by a processor of a computing device, baseline processes from the test data of the business application, wherein each of the baseline processes is identified by a distinctive set of markers indicating a unique pattern;
   retrieving, by a processor of a computing device, actual data of the business application from a deployed business process system, wherein the actual data is generated during a deployment phase of the business application and represents resource usage and an application-specific parameter of the business application;
   identifying, by the processor, the business processes from the actual data of the business application;
   matching, by the processor, each of the business processes to one of the baseline processes identified during the testing phase;
   measuring, by the processor, amounts of deviation of the business processes from the corresponding baseline processes;
   comparing, by the processor, the amounts of deviation of the business processes to a threshold to determine which ones of the business processes were not tested during the testing phase;
   in response to a determination that the amount of deviation of a first business process of the business processes is greater than the threshold, which indicates the first business process was not tested during the testing phase, executing, by the processor, a test on the first business process; and
   generating, by the processor, a report that includes the amounts of deviation between the business processes of the business application and the corresponding baseline processes identified during the testing phase.

2. The method of claim 1, further comprising:
   based on the amounts of deviation, reporting on whether the business processes are defined differently during the testing phase than the way the business processes are being used in practice.

3. The method of claim 1, further comprising:
   based on the amounts of deviation, reporting on whether one of the baseline processes identified during the testing phase is being used in practice.

4. The method of claim 1, wherein the amounts of deviation are measured based on a BLAST algorithm.

5. The method of claim 1, wherein the amounts of deviation are measured based on a Levenshtein algorithm.

6. The method of claim 1, wherein the amounts of deviation are measured based on a Smith-Waterman algorithm.

7. A system for optimizing business processes, comprising:
   a processor; and
   a memory device that stores instructions that are executable by the processor to cause the processor to:
   store, in a database, test data of a business application generated during a testing phase of the business application;
   identify baseline processes from the test data of the business application, wherein each of the baseline processes includes a distinctive set of markers indicating a unique pattern;
   retrieve actual data of the business application, wherein the actual data is generated during a deployment phase of the business application and represents resource usage and an application-specific parameter of the business application;
   identify the business processes from the actual data of the business application;
   match each of the business processes to one of the baseline processes identified during the testing phase;
   measure amounts of deviation of the business processes from the corresponding baseline processes;
   compare the amounts of deviation of the business processes to a threshold to determine which ones of the business processes were not tested during the testing phase;
   in response to a determination that the amount of deviation of a first business process is greater than the threshold, which indicates the first business process was not tested during the testing phase, execute a test on the first business process; and generate a report comprising the amounts of deviation between the business processes of the business application and the baseline processes identified during the testing phase.

8. The system of claim 7, wherein, based on the amounts of deviation, the instructions are executable to cause the processor to determine whether the baseline processes are defined differently during the testing phase than the way the business processes are being used in practice.

9. The system of claim 7, wherein, based on the amounts of deviation, the instructions are executable to cause the processor to determine whether one of the baseline processes identified in the testing phase is being used in practice.

10. The system of claim 7, wherein the amounts of deviation are measured based on a BLAST algorithm.

11. The system of claim 7, wherein the amounts of deviation are measured based on a Levenshtein algorithm.

12. The system of claim 7, wherein the amounts of deviation are measured based on a Smith-Waterman algorithm.

13. A non-transitory, computer readable medium, storing instructions that are executable to cause a processor to:
    store, in a database, test data of a business application generated during a testing phase of the business application;
    identify baseline processes from the test data of the business application, wherein each of the baseline processes includes a distinctive set of markers indicating a unique pattern;
    retrieve actual data of the business application, wherein the actual data is generated during a deployment phase of the business application and represents resource usage and an application-specific parameter of the business application;
    identify business processes from the actual data of the business application;
    match each of the business processes to one of the baseline processes identified during the testing phase;
    measure amounts of deviation of the business processes from the corresponding baseline processes;
    compare the amounts of deviation of the business processes to a threshold to determine which ones of the business processes were not tested during the testing phase;
    in response to a determination that the amount of deviation of a first business process of the business processes is greater than the threshold, which indicates the first business process was not tested during the testing phase, execute a test on the first business process; and
    generate a report comprising the amounts of deviation between the business processes of the business application and the baseline processes identified during the testing phase.

14. The non-transitory computer readable medium of claim 13, wherein the instructions are executable to cause the processor to:
    based on the amounts of deviation, report on whether the baseline processes are defined differently during the testing phase than the way the business processes are being used in practice.

15. The non-transitory computer readable medium of claim 13, wherein the instructions are executable to cause the processor to:
    report on whether one of the baseline processes identified during the testing phase is being used in practice.

16. The computer readable medium of claim 13, wherein the amounts of deviation are measured based on a BLAST algorithm.

17. The computer readable medium of claim 13, wherein the amounts of deviation are measured based on a Levenshtein algorithm.

* * * * *